(12) United States Patent
Marra et al.

(10) Patent No.: US 9,063,972 B1
(45) Date of Patent: Jun. 23, 2015

(54) INCREASING USER RETENTION AND RE-ENGAGEMENT IN SOCIAL NETWORKING SERVICES

(75) Inventors: Gregory M. Marra, San Francisco, CA (US); Frances B. Haugen, Mountain View, CA (US); Christopher J. Marra, South Windsor, CT (US)

(73) Assignee: Google Inc., Mountain View, CA (US)

( * ) Notice: Subject to any disclaimer, the term of this patent is extended or adjusted under 35 U.S.C. 154(b) by 180 days.

(21) Appl. No.: 13/551,043

(22) Filed: Jul. 17, 2012

(51) Int. Cl.
*G06F 7/00* (2006.01)
*G06F 17/30* (2006.01)

(52) U.S. Cl.
CPC ...... *G06F 17/30424* (2013.01); *G06F 17/3051* (2013.01)

(58) Field of Classification Search
CPC ............... G06F 17/30424; G06F 17/30867; G06F 17/2872; G06F 17/30286; G06F 17/30828; G06F 17/30864; G06F 17/3051; G06F 17/30648; H04L 67/22
See application file for complete search history.

(56) References Cited

U.S. PATENT DOCUMENTS

| | | | |
|---|---|---|---|
| 6,754,647 B1 * | 6/2004 | Tackett et al. | 706/52 |
| 2003/0018777 A1 * | 1/2003 | Miller et al. | 709/223 |
| 2007/0271155 A1 * | 11/2007 | Rouda et al. | 705/27 |
| 2009/0150214 A1 * | 6/2009 | Mohan | 705/10 |
| 2011/0276396 A1 * | 11/2011 | Rathod | 705/14.49 |
| 2012/0036080 A1 * | 2/2012 | Singer et al. | 705/319 |
| 2012/0036137 A1 * | 2/2012 | Naidu et al. | 707/748 |
| 2013/0110978 A1 * | 5/2013 | Gordon et al. | 709/218 |
| 2013/0117257 A1 * | 5/2013 | Meijer et al. | 707/719 |
| 2013/0212114 A1 * | 8/2013 | Needham et al. | 707/748 |

\* cited by examiner

*Primary Examiner* — Taelor Kim
(74) *Attorney, Agent, or Firm* — McDermott Will & Emery LLP (57) ABSTRACT

Methods, systems, and apparatus, including computer programs encoded on a computer storage medium, for engaging a user in a previously-submitted search query in a social networking system are disclosed. The method includes receiving a search query from a user, receiving search results responsive to the search query, providing search results for display to the user, receiving one or more user interactions associated with the search results, and generating a search interaction score based on the one or more user interactions. The method further includes determining that the search interaction score exceeds a threshold search interaction score, receiving a reminder event relating to the search query, and in response to determining that the search interaction score exceeds the threshold search interaction score and the reminder event, providing a notification to the user relating to the search query.

24 Claims, 6 Drawing Sheets

INCREASING USER RETENTION AND RE-ENGAGEMENT IN SOCIAL NETWORKING SERVICES

BACKGROUND

This specification generally relates to engaging users with previously-searched queries in a social networking service.

Internet-based social networking services provide a digital medium for users to interact with one another and share information. For examples, users are able to distribute digital content (e.g., textual comments, digital images, digital videos, digital audio, hyperlinks to websites, etc.) to other users that they might be connected with in the social networking service. Digital content that is distributed to a user can be displayed to the user in a stream page.

SUMMARY

In general, innovative aspects of the subject matter described in this disclosure may be embodied in methods that include the actions of receiving a search query from a user, receiving search results responsive to the search query, providing search results for display to the user, receiving one or more user interactions associated with the search results, and generating a search interaction score based on the one or more user interactions. The method may further include determining that the search interaction score exceeds a threshold search interaction score, receiving a reminder event relating to the search query, and in response to determining that the search interaction score exceeds the threshold search interaction score and the reminder event, providing a notification to the user relating to the search query.

Other implementations of this aspect include corresponding systems, apparatus, and computer programs, configured to perform the actions of the methods, encoded on computer storage devices.

These and other implementations may each optionally include one or more of the following features. For example, in some implementations, the interaction score is reflective of a time period in which the one or more user interactions associated with the search results occurred. In some implementations, generating a search interaction score includes assigning a numerical value to each of the one or more user interactions associated with the search results. In some implementations, the one or more user interactions associated with the search results are selected from the group consisting of a selection of, an endorsement of, a sharing of, and a comment on an entry in the search results.

In some implementations, the notification includes a message to the user to re-engage the search query. In some implementations, the method further includes receiving a user response to the notification, and upon receiving the user response to the notification, displaying search results responsive to the search query.

In some implementations, the reminder event relating to the search query is prompted by global search trends. In some implementations, the reminder event is prompted by a passage of a predetermined time in which the user has not re-submitted the search query. The reminder event may be prompted by other events, such as events relating to the search query or the search query becoming a popular search query.

In some implementations, the threshold search interaction score is an average interaction score based on the user's past search interaction scores. In some implementations, the threshold search interaction score is unique to the user.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

In general, implementations of the present disclosure are directed to engaging users with previously-searched queries in a social networking service. In particular, implementations of the present disclosure are directed to recognizing a user's preferred searches and interactions within a computer-implemented social networking service and reminding the user of the preferred searches and interactions at a later time. In some examples, if a user submits a search query and interacts with the search results (e.g., viewing several search result entries, commenting on search results, and/or endorsing certain search results), it can be determined that the user has shown a threshold level of interaction with the search query and search results. At a later time, it can be determined that the user has not interacted with the search query within a predetermined period of time, and the social networking service can act to remind the user of the search query in an effort to re-engage the user in a topic in which the user had previously shown interest.

For purposes of illustration, implementations of the present disclosure are described within the context of an example social networking service. The example social networking service enables users to organize contacts into social circles. It is appreciated, however, that implementations of the present disclosure can be used in other types of social networking services and are not limited to social networking services that include social circles.

Figure 1:
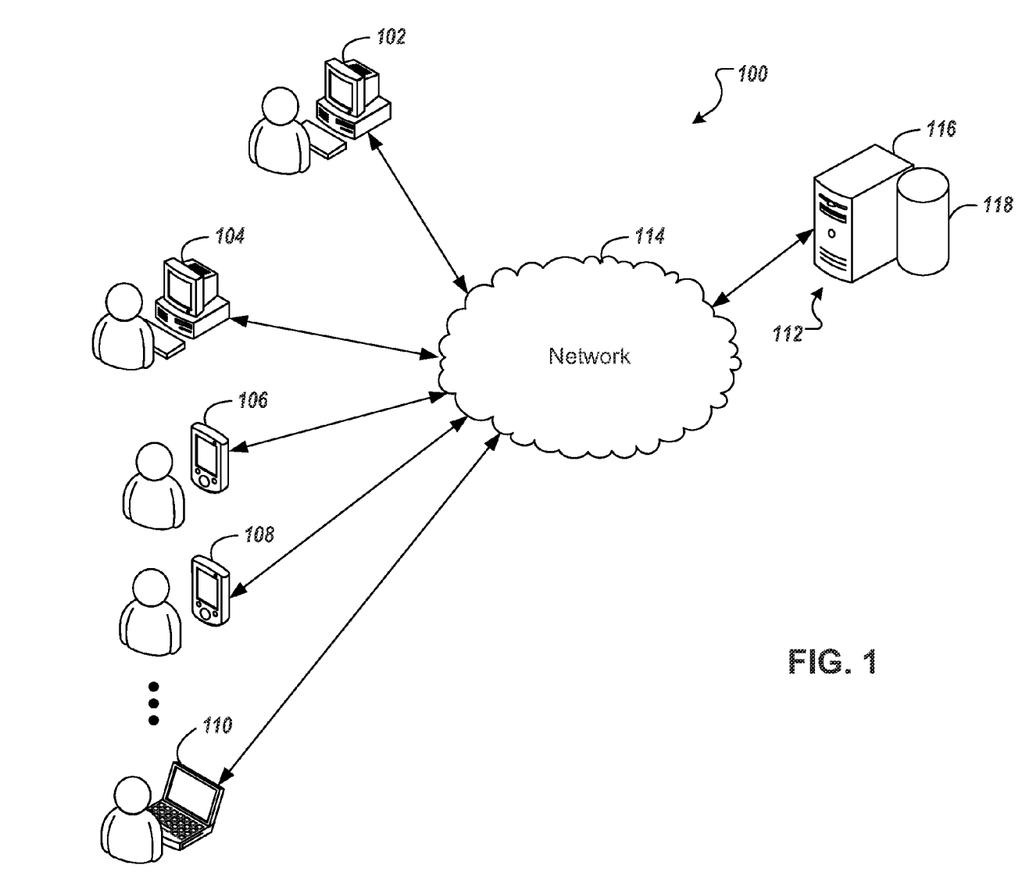
FIG. 1 is a diagram of an example network architecture.

FIG. 1 is a diagram of an example network architecture 100. The network architecture 100 includes a number of client devices 102, 104, 106, 108, 110 communicably connected to a server system 112 by a network 114. The server system 112 includes a processing device 116 and a data store 118. The processing device 116 executes computer instructions stored in the data store 118, e.g., to perform the functions of a social network server.

Users of the client devices 102, 104, 106, 108, 110 access the server device 112 to participate in a social networking service. For example, the client devices 102, 104, 106, 108, 110 can execute web browser applications that can be used to access the social networking service. In another example, the client devices 102, 104, 106, 108, 110 can execute software applications that are specific to the social networking service (e.g., social networking "apps" running on smartphones).

Users interacting with the client devices 102, 104, 106, 108, 110 can participate in the social networking service provided by the server system 112 by digital content, such as text comments (e.g., updates, announcements, replies), digital images, videos, audio files, and/or other appropriate digital content. In some implementations, information can be posted on a user's behalf by systems and/or services external to the social networking service or the server system 112. For example, the user distributes an item including a review of a movie to a movie review website, and with proper permissions that website can cross-post the review to the social networking service on the user's behalf. In another example, a software application executing on a mobile device, with proper permissions, can use global positioning system (GPS) capabilities to determine the user's location and automatically update the social network with his location (e.g., "At Home", "At Work", "In Brownsdale, Minn."). Generally, users interacting with the client device 102, 104, 106, 108, 110 can also use the social networking service provided by the server system 112 to define social circles to organize and categorize the user's relationships to other users of the social networking service.

In some implementations, the client devices 102, 104, 106, 108, 110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
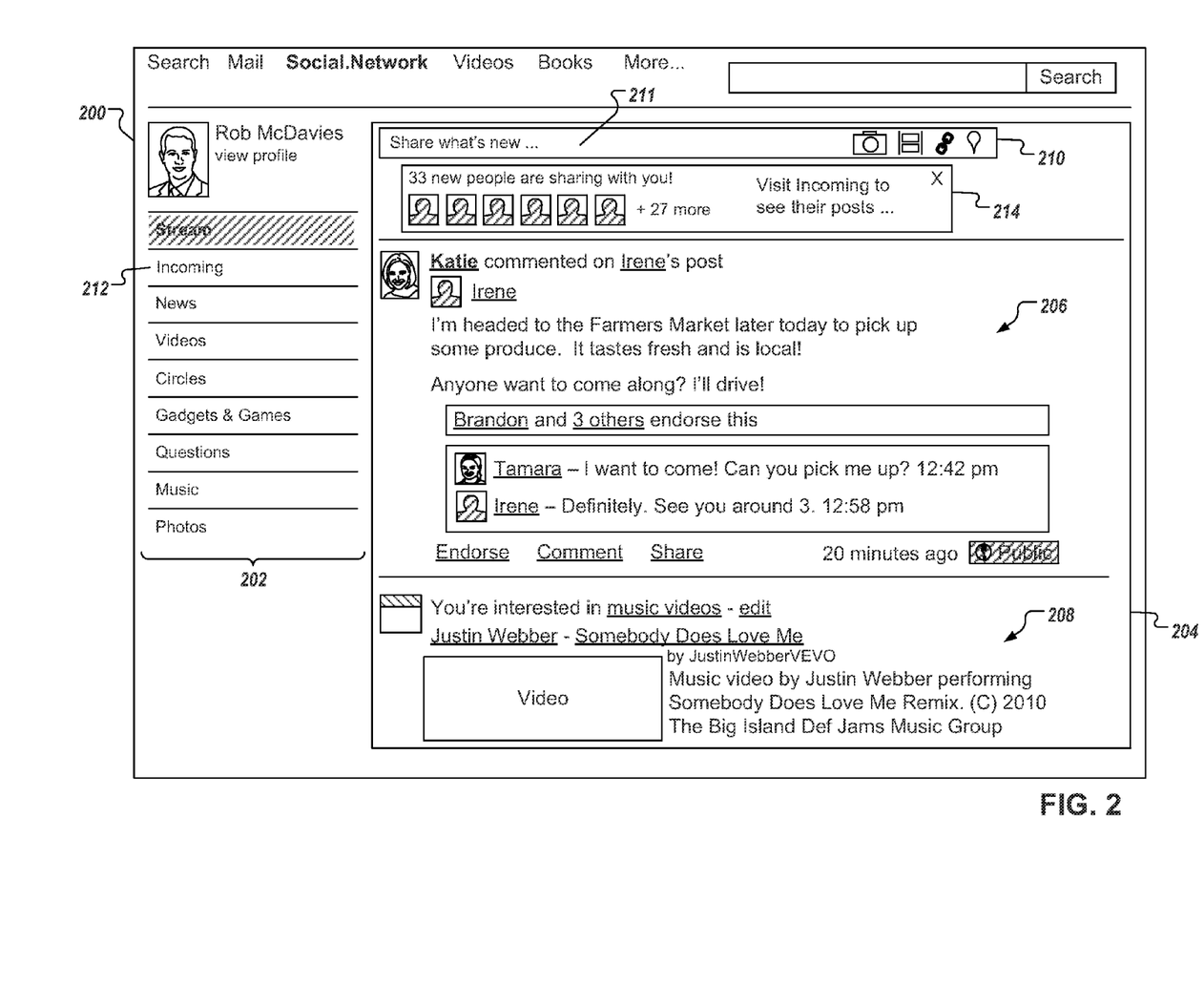
FIG. 2 depicts a screen-shot of an example web page including an activity stream for a user of a social networking service.

FIG. 2 depicts a screen-shot of an example web page 200 including an activity stream 204 for a user of a social networking service. For example, the web page 200 can be provided as a web page within a website of a social networking service, and can display items of digital content that have been shared with a user associated with the web page 200. A similar page may be shown to a user of a social networking service using a mobile application rather than a website. In the illustrated example, the example user includes "Rob McDavies" and the web page 200 displays items of digital content that other users have shared with the user and/or items that the user has shared with other users. The web page 200 includes a social network menu 202 and the activity stream 204. As used herein, the term activity stream can include a graphically displayable collection of items that have been distributed to and/or from, or are otherwise accessible by a user of a social networking service. Example items 206, 208 that have been distributed to the user are displayed in the activity stream 204. Generally, the items 206, 208 displayed in the activity stream 204 include digital content that is distributed to the user from contacts established within the social networking service. A content sharing interface 210 can also be provided. The user can activate (e.g., click on) the content sharing interface 210 to share digital content. Although two items 206, 208 are depicted in FIG. 2, it is appreciated that the activity stream 204 can display any number of items to the user.

Social networking services gain popularity through increased users and increased engagement by individual users. The more often a user interacts with a social networking service, the more likely the user will encourage friends to join and engage in the social networking service. As such, it is desirable to create an environment in a social networking service that is appealing to users and that provides an entertaining, informative and dynamic experience. Implementations of the present disclosure provide systems and techniques by which a social networking service can engage users in an effort to increase user retention. In some examples, implementations determine content in which users engage in at least a threshold level of interaction and remind the user of this content at a later time to re-engage the user with the content.

In some implementations, search options are made available by social networking services. In some examples, a user of a social networking service can perform a search of content distributed within the social networking service based on a search query, and the social networking service can display search results that are responsive to the search query. The search results can be gathered from various sources including, for example, posts from other users of the social network, news articles, and web sites on the Internet. Posts from other users of the social network can provide a user insight as to what other users of the social networking service are saying about a topic or event.

In some implementations, when the user of the social networking service is presented with search results, the user interacts with the search results. In some examples, interactions can include scrolling through the search results, endorsing one or more search results, clicking on one or more search results, commenting on one or more search results, and/or sharing one or more search results using the social networking service. In some examples, the user can interact with the search results by clicking on links associated with the search results. In some examples, the user can have the option to comment on the search results, collectively or individually, and/or to share the results, collectively or individually, with other users of the social networking service. In some examples, the user can endorse one or more of the search results. It is appreciated that other types of interactions with the search results responsive to the search query are possible.

In some implementations, the social networking service quantifies the user's interaction with the search results. For example, the social networking service can quantify the amount of time the user spends interacting with the search results and/or the quality of the interactions. In some examples, an interaction score is generated based on the user's interactions with the search results (e.g., click-throughs, endorsements, shares, comments). In some examples, if a user does not click on any of the results, or spends very little time viewing the results, the interaction score would be relatively low. In contrast, if the user spends time viewing (e.g., scrolling through) the search results, commenting on one or more of the search results, and/or sharing search results, the interaction score would be relatively high.

In some implementations, user interactions can include endorsing search results, commenting on search results and/or sharing search results, among other possible interactions discussed herein. Endorsing a search result can indicate that the endorser enjoyed or approves of the search result to other users, possibly encouraging other users to view, endorse, comment on and/or share the search result. Commenting on a search result can provide a dialogue with other users who view the search result, resulting in a more engaging search result. Sharing a search result displays the search result with other people who may otherwise have not seen or had the permission to see the item underlying the search result. The item can then be endorsed, commented on, or shared by new viewers who see the item. In some instances, popular sharing of an item may cause the item to "go viral," or be shared and passed along quickly and often.

In some implementations, the interaction score can be determined based on one or more sub-scores, each sub-score being based on an interaction type. In some examples, a first sub-score can be provided based on whether and how much time the user scrolled through the search results. For example, a value of the first sub-score can reflect the length of time that the user spent scrolling through (e.g., viewing) the search results. In some examples, a second sub-score can be provided based on user clicks on the search results. For example, each time the user clicks on a search result (e.g., clicks on a hyperlink displayed within a search result), the second sub-score can be incremented. In some examples, a third sub-score can be provided based on user endorsements of search results. For example, each time the user endorses a search result (e.g., clicks on an endorse button associated with the search result) the third sub-score can be incremented. In some examples, a fourth sub-score can be provided based on user comments to search results. For example, each time the user comments on a search result, the third sub-score can be incremented. In some examples, a fifth sub-score can be provided based on the user sharing to the search results, discussed in further detail below. For example, each time the user shares to the search results, the fifth sub-score can be incremented. In some examples, a sixth sub-score can be provided based on an amount of time the user spends viewing the search results. For example, the sixth score can be provided based on a length of time the user views the search results. In some examples, time can be a particularly important heuristic for a user who passively engages with social networking services, viewing items but seldom clicking on, endorsing, commenting on, or sharing items. It is appreciated that the above-described sub-scores include example sub-scores and that other sub-scores are within the scope of the present disclosure.

In some implementations, the interaction score can be provided based on one or more of the plurality of sub-scores. In some examples, the sub-scores can be summed to provide the interaction score. In some examples, respective weights can be applied to the sub-scores to adjust a relative influence of the sub-scores on the interaction score. For example, a first weight can be applied to the first sub-score (discussed above) and a second weight can be applied to the fifth sub-score (discussed above), such that the fifth sub-score has a greater influence on the interaction score. In this example, a user sharing to the search results can be weighted more heavily, and thereby considered a more significant interaction, than the user scrolling through the search results.

In some implementations, a level of user interest in the search results can be reflected based on the level of user interaction with the search results. In some examples, if a user has quality interactions with search results for a period of time, it can be determined that the user would likely be interested in interacting with search results responsive to the same search query at a later time. For example, if the interaction score exceeds a threshold interaction score, it can be determined that the user was sufficiently interested in the search results, such that the user can be reminded of the search at a later point in time.

In some examples, the threshold search interaction score is based on an average interaction score. For example, the average interaction score can be provided as a mean interaction score based on past interactions with search results. In some examples, the threshold interaction score is unique to each user of the social networking service. This can be particularly useful because different people use and interact with social networking services in different manners. In some examples, the threshold interaction score is an aggregate across all users or a subset of users of the social networking service.

In some implementations, users of a social networking service can be categorized based on their respective levels of interaction. Users who are very interactive (e.g., frequently clicking on items, posting new items, endorsing other user's items, commenting on items, and sharing items with others) can be provided in an example first category. An example second category can include users who often comment on items, such users being fairly interactive in their use of social networking services, but not as interactive as users in the first category. An example third category can include users who occasionally endorse items while using social networking services, such users being less interactive than both the first category and the second category. An example fourth category can include users who passively interact within social networking services. In some implementations, a user can be categorized based on their average interaction score. In some implementations, each category of user includes a corresponding threshold interaction score. In some examples, the threshold interaction score can be provided as an average interaction score of users in a particular category.

In some examples, after a period of time has passed since the user last interacted with the search results responsive to the search query, the social networking service can display a reminder to the user regarding the search query. In some examples, a request can be displayed to the user requesting whether the user would like to see search results responsive to that search query. In some examples, the request can be prompted by a particular event, such as a news topic related to the search query, or a current popularity of the search query or related search queries.

In some implementations, the reminder event can be related to the search query itself. For example, on Jul. 28, 2011, a user may have submitted a search query with the search term "Presidential election 2012." As the 2012 Presidential election neared, the social networking service may recognize certain dates prior to and leading up to Nov. 6, 2012, as reminder events, relating to the original search query.

In another example, a user may submit a search query to a social networking site with the search term "Feudal Tales" on Jan. 23, 2011. The social networking service may recognize that a new book in the "Feudal Tales" series is scheduled to be released on Jul. 15, 2011, and recognize that date as a reminder event. The social networking service may also recognize that the first season of the "Feudal Tales" TV series is slated to debut on Apr. 17, 2011, and recognize that date and event as a reminder event. The social networking service may further recognize that the second season of the "Feudal Tales" TV series starts airing on Apr. 15, 2012, and recognize that date and event as a reminder event.

In some embodiments, a reminder event is not necessarily tied to a particular outside event relating to the search query but instead to general trends in search queries (which may be prompted by outside events relating to the search term). For example, in the "Feudal Tales" example, a reminder event may be prompted by the season two season premiere, but it also may be prompted by many users submitting searches for "Feudal Tales" on and around Apr. 15, 2012. In these embodiments, one or more popular searches may cause a reminder event, where the one or more popular searches are related to a search query that was previously submitted by the user.

For example, if the terms "John Hoff", "Andrew Finn", and "keep on fighting" are all popular search queries and all relate to "Feudal Tales," a reminder event for the related search term "Feudal Tales" may be received. Terms may be determined to be related based on the content of the search results. That is, search results for "John Hoff", "Andrew Finn", and "keep on fighting" all likely include references to "Feudal Tales" so the terms may be deemed to be related searches. In some embodiments, the reminder event is prompted by new entries in the search results responsive to a previously-submitted search query.

Figure 3A:
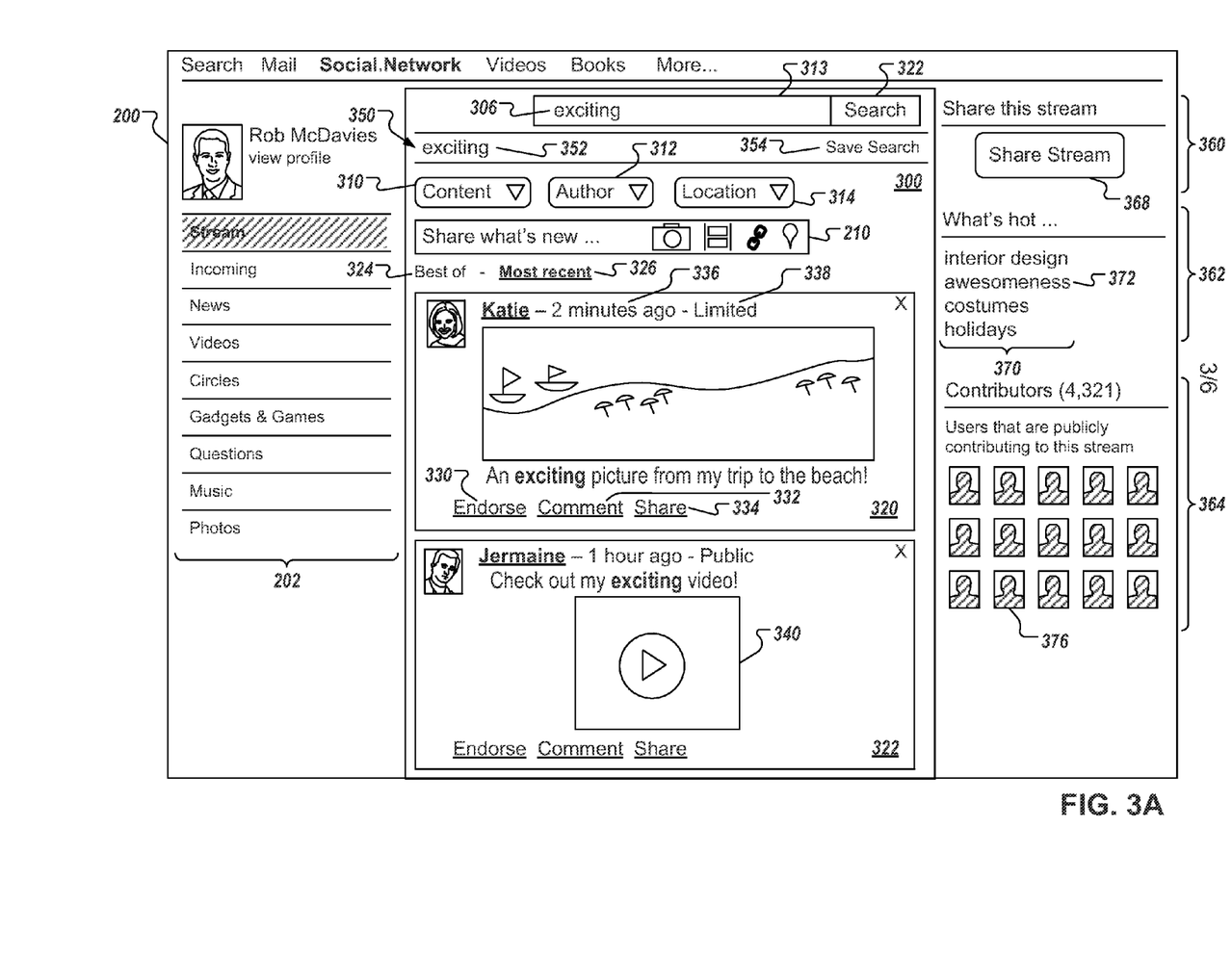
FIGS. 3A-3C depict screen-shots of an example user interaction with the social networking service.
Figure 3B:
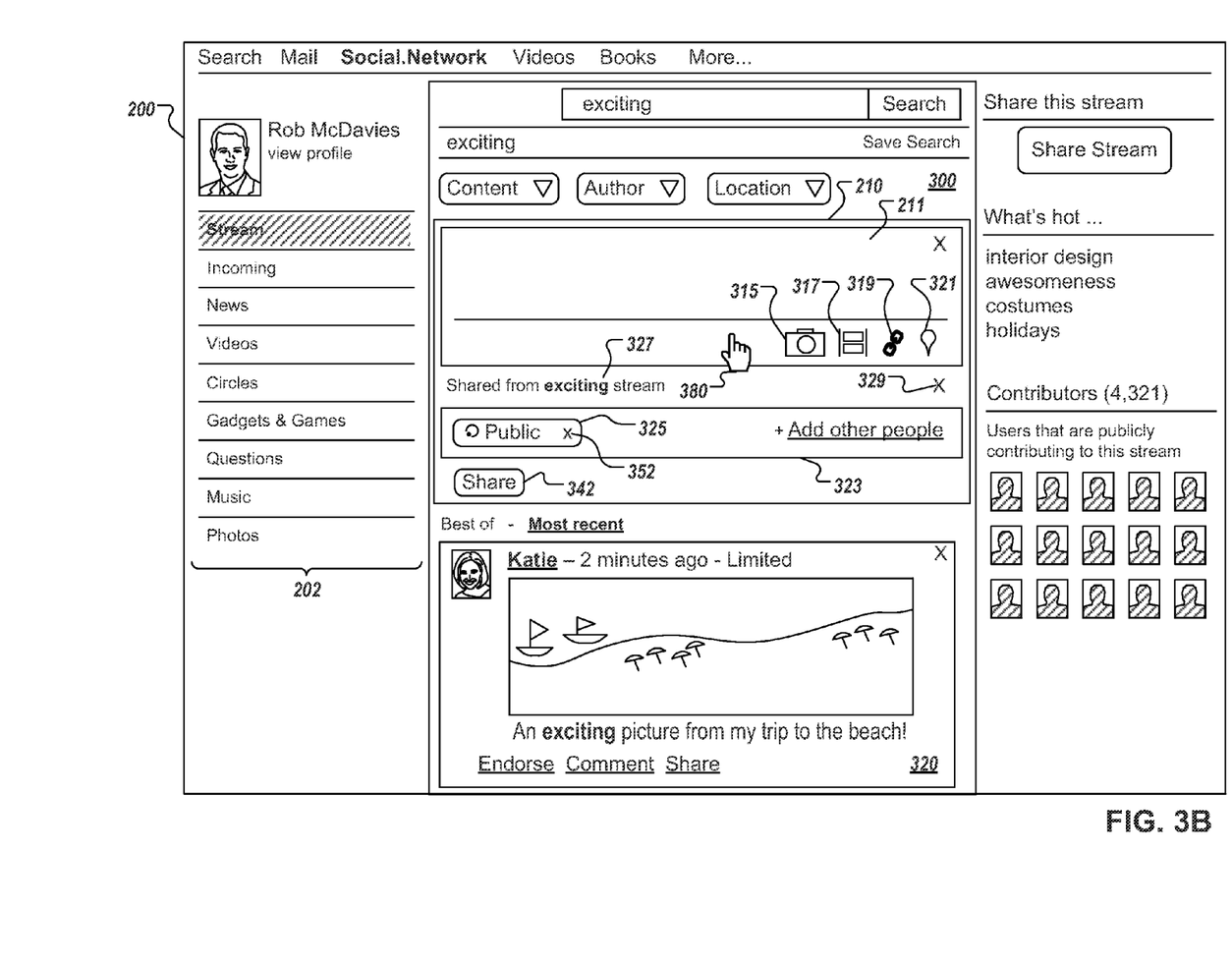
Figure 3C:
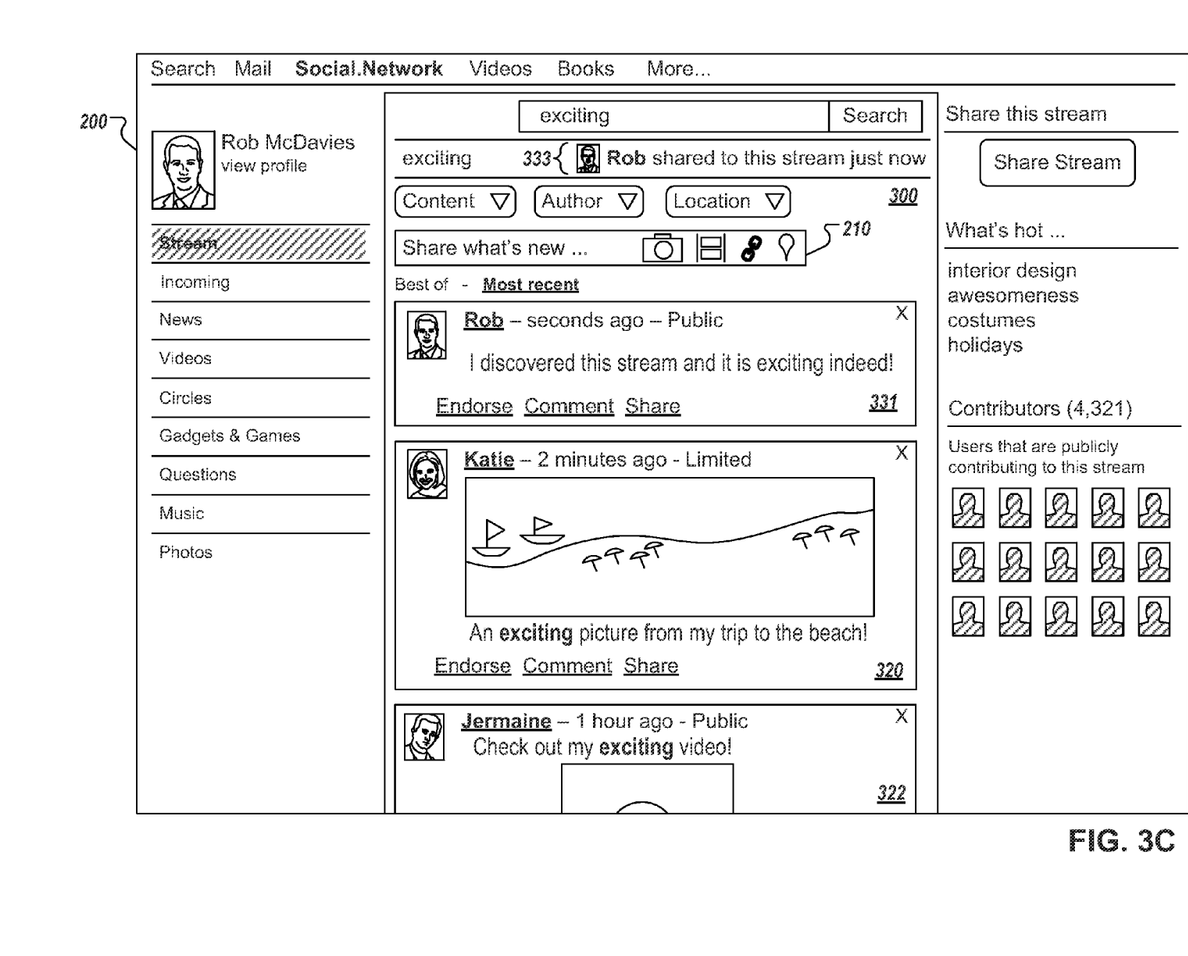

FIGS. 3A-3C depict screen-shots of an example user interaction with the social networking service. FIG. 3A depicts a screen-shot of an example search stream 300 for a user of a social networking service. In the example of FIG. 3A, the search stream 300 is displayed within the web page 200. In this example, the web page 200 includes the search field 313 in which a search query 306 (e.g., a text or image query) can be entered. In this example, the search query 306 is the term "exciting." When the search term 306 is submitted as a search query to the social networking service (e.g., upon activation of the search control 322), the social networking service returns the search stream 300 including items that are responsive to the search term 306.

In some examples, the type of content displayed in the search stream 300 can be defined before or after the search is executed. For example, filter controls 310, 312, 314 can be activated to limit the displayed items. In the depicted example, the search stream 300 includes an item 320 and an item 322, as well as one or more other items that are not currently visible. The one or more other items can be viewed, for example, by scrolling up or down the search stream 300 using a scroll control. The items of the search stream 300 can be sorted according to sort controls 324, 326. In the depicted example, the items of the search stream 300 are displayed in order of time posted. For example, the items are displayed in descending order based on the time at which the items were distributed to the social networking service.

As shown in FIG. 3A, the search stream 300 can be presented in a format that resembles the format in which an activity stream is presented (e.g., the activity stream 204 of FIG. 2). For example, the search stream 300 can have the same look and feel as an activity stream associated with the social networking service. The search stream 300 can be organized and presented in a manner that resembles the postings and content that would appear in a user's activity stream. For example, the items 320, 322 are displayed in a format that is similar to the format in which the items 206, 208 are displayed in the activity stream 204. For example, borders and shapes of the items can be similar, and the placement of endorsement controls 330, comment controls 332, re-sharing controls 334, a timestamp 336, and the visibility indicator 338 can be similar to like controls and indicators of the activity stream 204.

The stream format can also specify how other features are presented. For example, the presence and/or placement of mute, block, comment, share, and content tag features can also be specified by the stream format and can be followed by the activity stream and the search stream. Further, the stream format can also specify a presence and/or placement of privacy controls (e.g., what members or groups may view certain content), a collapsible structure (e.g., content windows that can be collapsed or minimized in response to the activation of a control), or a tabbed structure (e.g., a structure that enables content to be opened in tabs within a single user interface, for example, a browser). Presenting activity and search streams in a common stream format enables the social networking service to provide content to users in a familiar format so that users may more easily find and interact with the content they are seeking.

In some examples, content associated with items 320, 322 within the search stream 300 can be accessed in its entirety without leaving the search stream 300 or the social networking service. For example, the item 322 includes video content 340 (e.g., a video clip) that can be accessed or played by activation of associated controls. Accordingly, the search stream 300 can provide digital content that is immediately accessible to users. For example, a user viewing the search stream 300 need not navigate away from the search stream 300 to access the video content 340. Other types of content can also be accessed (e.g., in its entirety) within the search stream 300. For example, articles, audio content (e.g., music files), image content (e.g., images, for example, pictures in native resolution) and other content can be fully accessed within the search stream 300.

With continued reference to FIG. 3A, the search stream 300 includes a search summary 350. In the depicted example, the search summary 350 includes a recitation 352 of the search query used to generate the search stream 300 and provides a save control 354 to enable the searching user to save the search. For example, the searching user can activate (e.g., click on) the save control 354 to save the search. In this manner, instead of recreating the search stream 300 by submitting another search query 606, the searching user can select a saved search from a list of saved searches. The user's interactions with the search stream 300 may be received and processed to calculate a search interaction score, as described below.

In some implementations, the web page 200 includes a stream sharing section 360, a popular search section 362 and/or a contributors section 364. The stream sharing section 360 includes a stream sharing control 368. The user can share the displayed search stream (e.g., the search stream 300) to other users of the social networking service by activating (e.g., clicking on) the stream sharing control 368, as discussed in further detail herein. The popular search section 362 includes a list 370 of popular search queries 372 that have been submitted by users of the social networking service to generate respective search streams. In some implementations, each search query 372 can be provided as a control such that, when a user activates (e.g., clicks on) a search query 372, a corresponding search stream is automatically displayed. In some examples, and in response to the user clicking a search query 372, the search query is submitted to and is processed by a search engine to identify one or more items that are relevant to the search query, the items are filtered to include only items that the user is able to access, and the items are displayed as a search stream. The contributors section 364 provides graphical representations 376 and/or other information associated with users that have contributed one or more items to the particular search stream being displayed. In the example of FIG. 3A, the graphical representations 376 include thumbnail images associated with the respective users, each thumbnail image corresponding to an author user of an item that is displayed in the search stream 300. In some examples, the graphical representations 376 can be activated to provide further detail regarding a particular contributor. For example, a user can activate (e.g., click on) a graphical representation 376 and, in response, a profile page associated with the particular contributor can be displayed. In some examples, a user can hover over a graphical representation 376 and, in response, information regarding the particular contributor can be displayed.

FIGS. 3B and 3C depict item sharing to the example search stream 300 of FIG. 3A. As discussed in further detail below, a user can share items directly to the search stream 300 using the content sharing interface 210. For example, the user "Rob McDavies" can activate (e.g., click on) the content sharing interface 210 to initiate generation and distribution of an item to be included in the search stream 300.

The content sharing interface 210 includes the content entry area 211. In some implementations, the user can select the content input area 211 to input and/or select digital content for distribution. For example, a pointer 380 can be used to interact with (e.g., click on) the content input area 211 and initiate an interaction with the content sharing interface 210. For example, the user can click on the content entry area 211 to initiate the entry of text as part of an interaction with the content entry area 211.

In some implementations, the user can select an icon 315, 317, 319, 321 to initiate input and/or selection of digital content that is to be distributed. In the illustrated implementation, for example, the user can select an icon 315 to initiate a process for selecting a digital image (e.g., stored in computer-readable memory) to be distributed. For example, the user can click on the icon 315, and, in response to the click, a user interface can be presented in which the user may be able to upload a digital image file, select a digital image file that was previously uploaded, and/or provide a URL corresponding to a digital image found elsewhere on the Internet. In some implementations, once a digital image file has been identified, a thumbnail of the digital image and/or information about the image (e.g., address, filename, caption, title, size, date taken) may appear in the content input area 211.

In the illustrated implementation, for example, the user can select an icon 317 to select a digital video (e.g., stored in computer-readable memory) to be distributed. For example, the user can click on the icon 317, and, in response to the click, a user interface can be presented in which the user may be able to upload a digital video file, select a digital video file that was previously uploaded, and/or provide a URL corresponding to a digital video file found elsewhere on the Internet. In some implementations, once a digital video file has been identified, a thumbnail frame capture of the digital video and/or information about the digital video (e.g., address, filename, description, title, size, date taken) may appear in the content input area 211. In some implementations, shared content may be accompanied by information other than a URL or other identifier. For example, the user may click on the icon 317 to share an identified video as shared content. The shared content can include not only an identifier of the video content, but also a playback start point and duration. In such an example, the user can share a subsection of the identified video with his targeted contacts.

In the illustrated implementation, for example, the user can select an icon 319 to provide a hyperlink (e.g., to a URL) for distribution. For example, the user can click on the icon 319, and, in response, a user interface can be presented in which the user may be able to type or paste in a uniform resource locator (URL) of a web page that the user intends to share. In some implementations, once a URL has been identified, a thumbnail preview of the identified page and/or information about the page (e.g., URL, website, page title, a thumbnail of a photo selected from the identified page) can be displayed in the content input area 211.

In the illustrated implementation, for example, the user can select an icon 321 to select a map location for distribution. For example, the user can click on the icon 321, and, in response, a user interface can be presented in which the user may be able to identify a place (e.g., business, landmark, facility, city) and/or a geographic location (e.g., physical address, latitude and longitude) that the user intends to share. In some implementations, once a location has been identified, a thumbnail map of the identified location and/or information about the location (e.g., URL, physical address, place name, a thumbnail of a photo of the identified place) can be displayed in the content input area 211.

In some implementations, when the icon 321 is activated, a user interface can be presented to provide the user with a collection of suggested places. For example, by activating the icon 321, a process can be initiated in which the user's current location can be determined, and that location information can be used to search for and identify a list of nearby places that the user may wish to share. In some implementations, by activating the icon 321, a process can be initiated in which a content item or content provided by the user can be processed to identify one or more places that may be associated with the content. For example, the user may enter text including "Honeymoon at Mt. Rushmore" and then click on the icon 321. In response, a process may be initiated to process the entered text and suggest "Mt. Rushmore National Monument" and/or "Rushmore Honeymoon Cabins" as suggested locations that can be included as part of the digital content that is to be distributed.

With particular reference to FIG. 3C, the content sharing interface 210 can expand to include a distribution interface 323 and a share button 742. In some implementations, the distribution interface 323 and the share button can be displayed in response to user activity (e.g., clicking on) with the content input area 211 including activity with one or more of the icons 315, 317, 319, 321. In some implementations, the content input area 211 also expands to provide additional room for input of digital content. The distribution interface 323 and the share button 342. The user can type or otherwise select identifiers to input into the distribution interface 323. The identifiers identify other users, categories of users and/or social circles to define distribution of the digital content (e.g., through a social network service). In some implementations, the identifiers can include contact identifiers, social circle identifiers, electronic messaging addresses, or any other appropriate identifier than can be used to identify one or more persons with whom content can be shared. The identifiers provided in the distribution interface 323 are used to generate an ACL that defines distribution of the digital content provided in the content input area 211.

An example identifier icon 325 is provided in the distribution interface 323. The identifier icon 325 is a visual representation of one or more users that the item is to be shared with. In the example of FIG. 3B, a user has tentatively indicated that item is to be shared publicly. In some examples, sharing the item publicly enables all users of the social networking service to access the item. In some examples, sharing the item publicly enables all users of the Internet to access the item. Until the item is committed, identifier icons provide a tentative distribution for the item. For example, the user can activate (e.g., click on) a delete control 352 to remove the identifier icon 325.

Once the user has defined and is satisfied with the distribution, the user can commit the item to be distributed. In some implementations, the user can activate (e.g., click on) the share button 342 to commit the item. Committing the item can cause operations to be performed to generate a corresponding item data set and distribute the digital content to the identified users, as discussed above.

In some implementations, the item can be shared directly to the displayed search stream 300. In some implementations, a source indicator 327 can be provided to indicate that the item being generated by the user will be an item that is shared directly to the particular search stream 300. Until the item is committed, the user can activate (e.g., click on) a delete control 329 to remove the source indicator 327. In this manner, the user can determine whether the item is to be shared directly to the particular search stream 300, or in general to the social networking service. For example, by sharing the item directly to the particular search stream, the user can ensure that the item is tied to the search stream such that it will be displayed within the search stream. In some examples, by sharing the item directly to the particular search stream, the item is appropriately indexed within a search index to be associated with search terms that would generate the search stream. In this manner, if the user and/or another user later recreate the search stream, the item will be included as an item displayed within the search stream. For example, and continuing with the example search query "exciting," the item can be tied to the "exciting" search stream even though the digital content provided in the item would not otherwise be determined to be relevant to search terms that would identify the item as a search result (e.g., the item does not include the term "exciting").

By sharing the item in general to the social networking service, the item is not necessarily tied to or relevant to a particular search stream. In some examples, the item might not be indexed within a search index, or might be indexed within a search index that is not associated with the particular search stream. For example, and continuing with the example search query "exciting," the item would not be sure to be tied to the "exciting" search stream. The item could relate to the "exciting" search stream, however, if the item includes digital content that is relevant to search terms resulting in the "exciting" search stream (e.g., the item includes the term "exciting").

Once the user commits the item for distribution, the corresponding item data set is generated and can include data, as discussed above. If the user shared the item directly to the displayed search stream, the item data set can also include source indication data directly tying the item to the particular search stream that the user shared the item to. In this manner, when the user and/or other users of the social networking service recreate the particular search stream, the item is displayed within the search stream. In some implementations, the item is automatically indexed to be tied to the search stream within a corresponding search index in response to the item having been shared directly to the search stream. In some examples, and as discussed in further detail below, the source indication data can be referenced to filter items displayed within a search stream.

Referring now to FIG. 3C, and in response to the user committing an item, the item can be immediately displayed in the search stream. For example, the user "Rob McDavies" can share an item directly to the search stream 300 such that, after committing the item, the item is displayed as item 331. In some examples, the search stream 300 is refreshed such that the item 331 is displayed in real-time in the search stream 300. In some examples, the terms real-time can indicate that the item is received and processed by a backend system (e.g., a server system) without intentional delay, taking into account the processing limitations of the backend system and the time required to accurately process the item. In some examples, refresh of the search stream 300 occurs in response to items being distributed that are relevant to the search stream 300, without requiring explicit user action (e.g., the user is not required to activate a refresh control).

In some implementations, a notification 333 can be generated when a user shares an item directly to the search stream 300. In the depicted example, and as discussed above, the user "Rob McDavies" shared the item 331 directly to the search stream 300. Consequently, the notification 333 indicates that that particular user shared an item to the particular search stream. In some examples, the notification 333 includes a thumbnail image associated with the sharing user and/or other identifying information (e.g., a user name), as well as a message indicating that the sharing user shared an item to the particular search stream. In some examples, a link can be provided to enable a user to click on the notification to access further information regarding the sharing user. For example, the thumbnail image and/or the user name can be associated with a hyperlink to a profile page of the sharing user within the social networking service.

In the example of FIG. 3C, the notification 333 is associated with the user "Rob McDavies," who both shared the item 331 directly to the search stream 300 and is viewing the search stream 300. In some implementations, the notification 333 can be generated when any user shares an item directly to the search stream. For example, if the user "Katie" had shared the item 320 directly to the search stream 300, the notification 333 would have notified the user "Rob McDavies" that the user "Katie" had shared an item directly to the stream. In this manner, users viewing a search stream can be immediately notified when another user has shared an item directly to the search stream. Further, such notifications can encourage users to share items directly to the search stream, thereby contributing to the collection of digital content available through the social networking service.

Notifications may also be generated with respect to other events or actions. For example, a notification may be generated when a reminder event occurs relating to a search query previously-submitted by a user. If the previously-submitted search query is a search query that the social networking service determines to have been highly engaged by the user, a notification may be generated to remind the user of the search query. In some instances, the user may perform an action prompting a reminder event, such as submitting a search query related to the previously-submitted search query. In some instances, another user may perform an action prompting a reminder event. For example, user "Rob McDavies" may perform a search query for "European debt" and spend a lot of time interacting with the search results responsive to his search query. If user "Katie" is a contact of user "Rob McDavies" using the social networking service and performs the same or a similar search query, a notification may be generated for user "Rob McDavies" that informs him that his contact, user "Katie", also performed a search for "European debt" and invite user "Rob McDavies" to re-engage with the search query and the search results. These notifications will be described in greater detail below.

With continued reference to FIGS. 3A-3C, it can be determined that the user scrolled through the search results (the search stream 300) and that the user shared to the search stream 300. Consequently, an interaction score can be determined for these example interactions. The interaction score can be compared to a threshold interaction score. It can be determined that the interaction score exceeds the threshold interaction score and, in response, it can be determined that the user should be subsequently reminded of the search query and the search results.

In some implementations, and at some period of time after the user last interacted with the search results, an event can occur that can be provided as a reminder event associated with the search query. For example, the example search query "exciting" can be determined to be a popular query (e.g., a frequency at which "exciting" is submitted as a search query exceeds a threshold frequency). In response to the event and the interaction score exceeding the threshold interaction score, it can be determined that the user is to be reminded about the search query. In some examples, a user may provide various contact information, such as one or more electronic message addresses and/or mobile telephone numbers, to the social networking service. In those examples, the social networking service may send reminder notifications to the user by sending an electronic message to the user's electronic message account or sending a message to the user's mobile device (e.g., by way of MMS or SMS). In some implementations, the social networking service may provide notifications through the social networking service itself such as through messages in the social networking service or visual or audio reminder notifications.

Figure 4:
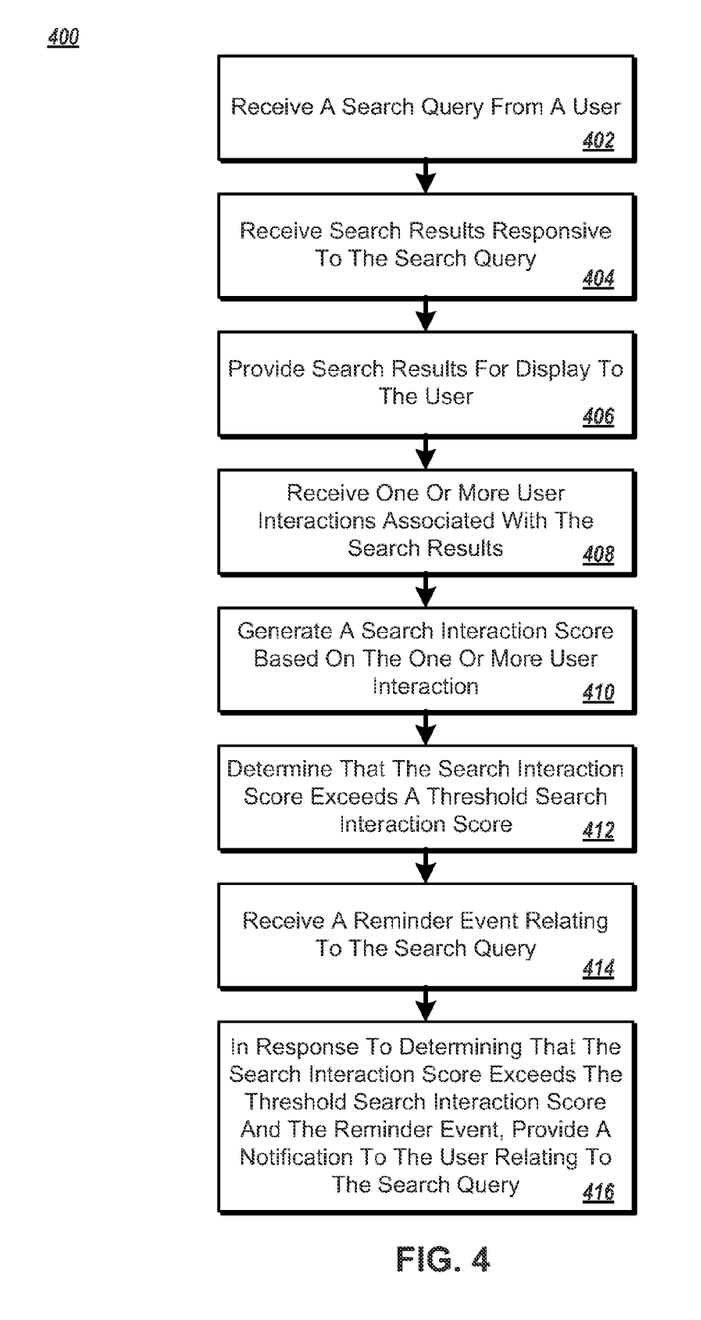
FIG. 4 is a flowchart of an example process that can be executed in implementations of the present disclosure.

FIG. 4 is a flowchart of an example process 400 that can be executed in implementations of the present disclosure. In some implementations, the example process 400 can include operations that are performed using one or more computer programs executed using one or more data processing apparatus (e.g., one or more client-side computing devices and/or one or more server-side computing devices). The example process 400 can be executed to display a search stream and facilitate user sharing to and/or of the search stream.

A search query is received from a user (402). For example, and in the screen-shots depicted in FIGS. 3A-3C, the search query 306 includes "exciting." The search query may be any term, comprising a single word or a group of words. Search results responsive to the search query are received (404) and the search results are provided for display to the user (406). For example, and with reference to FIG. 3A, the items 320, 322 can be determined to be responsive to the search query "exciting" and are displayed to the user.

One or more user interactions associated with the search results are received (408). In some examples, and as discussed above, user interaction can include the user selecting links associated with one or more items in the search results, commenting on one or more items in the search results, endorsing one or more items in the search results, sharing one or more items in the search results, sharing the search stream and/or sharing items of digital content to the search stream. For example, and with reference to FIGS. 3B and 3C, the user can share an item directly to the search stream 300.

A search interaction score is generated based on the one or more user interactions (410). In some examples, as discussed herein, each of the user interactions can be quantified based on the interaction type to provide the interaction score. The interaction score is determined to exceed a threshold interaction score (412). As discussed above, if it is determined that the interaction score exceeds the threshold search interaction score, the search results responsive to the search query can be determined to have some significance to the user. A reminder event relating to the search query is received (414). In some embodiments, the reminder event may be related to the search query itself. In response to the reminder event and determining that the interaction score exceeds the threshold interaction score, a notification relating to the search query is provided to the user (416).

While the above examples are discussed with respect to a user interacting with search results responsive to search queries, a variety of past user actions may be considered. For example, user interactions with games, photo albums, blogs, and the like may similarly be received to determine whether the user is highly engaged with a particular action or activity. The user interactions may be ranked or scored, and notifications may be provided to the user to increase future engagement by the user.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementation s are within the scope of the following claims. For example, the actions recited in the claims can be performed in a different order and still achieve desirable results.

What is claimed is:

1. A computer-implemented method executed using one or more processors, the method comprising:
   receiving a search query from a user,
   receiving search results responsive to the search query;
   providing search results for display to the user;
   receiving one or more user interactions associated with the search results;
   generating a search interaction score based on the one or more user interactions;
   determining that the search interaction score exceeds a threshold search interaction score;
   receiving a reminder event relating to the search query, wherein the reminder event is prompted by an occurrence other than re-submission of the search query by the user; and
   in response to determining that the search interaction score exceeds the threshold search interaction score and the reminder event, providing a notification to the user relating to the search query,
   wherein the notification invites the user to re-engage the search query and the search results,
   wherein the one or more user interactions associated with the search results are selected from a group including a selection of, an endorsement of, a sharing of, and a comment on an entry in the search results, and
   wherein the occurrence prompting the reminder event corresponds to one or more subsequent search queries, related to or matching the search query, reaching a threshold level of popularity.

2. The method of claim 1, wherein the interaction score is reflective of a time period in which the one or more user interactions associated with the search results occurred.

3. The method of claim 1, wherein generating a search interaction score comprises assigning a numerical value to each of the one or more user interactions associated with the search results.

4. The method of claim 1, further comprising:
   receiving a user response to the notification; and
   upon receiving the user response to the notification, displaying search results responsive to the search query.

5. The method of claim 1, wherein the reminder event relating to the search query is prompted by global search trends.

6. The method of claim 1, wherein the reminder event is prompted by a passage of a predetermined time in which the user has not re-submitted the search query.

7. The method of claim 1, wherein the threshold search interaction score is a mean interaction score based on the user's past search interaction scores.

8. The method of claim 1, wherein the threshold search interaction score is unique to the user.

9. A system comprising:
   one or more computer processors; and
   one or more non-transitory computer readable devices that include instructions that, when executed by the one or more computer processors, causes the processors to perform operations, the operations comprising:
   receiving a search query from a user,
   receiving search results responsive to the search query;
   providing search results for display to the user;

receiving one or more user interactions associated with the search results;

generating a search interaction score based on the one or more user interactions;

determining that the search interaction score exceeds a threshold search interaction score;

receiving a reminder event relating to the search query, wherein the reminder event is prompted by an occurrence other than re-submission of the search query by the user; and in response to determining that the search interaction score exceeds the threshold search interaction score and the reminder event, providing a notification to the user relating to the search query, wherein the notification invites the user to re-engage the search query and the search results, wherein the one or more user interactions associated with the search results are selected from a group including a selection of, an endorsement of, a sharing of, and a comment on an entry in the search results, and wherein the occurrence prompting the reminder event corresponds to one or more subsequent search queries, related to or matching the search query, reaching a threshold level of popularity.

10. The system of claim 9, wherein the interaction score is reflective of a time period in which the one or more user interactions associated with the search results occurred.

11. The system of claim 9, wherein generating a search interaction score comprises assigning a numerical value to each of the one or more user interactions associated with the search results.

12. The system of claim 9, wherein the operations further comprise:
  receiving a user response to the notification; and
  upon receiving the user response to the notification, displaying search results responsive to the search query.

13. The system of claim 9, wherein the reminder event relating to the search query is prompted by global search trends.

14. The system of claim 9, wherein the reminder event is prompted by a passage of a predetermined time in which the user has not re-submitted the search query.

15. The system of claim 9, wherein the threshold search interaction score is a mean interaction score based on the user's past search interaction scores.

16. The system of claim 9, wherein the threshold search interaction score is unique to the user.

17. A non-transitory computer readable storage medium encoded with one or more computer programs, the one or more computer programs comprising instructions that when executed by data processing apparatus cause the data processing apparatus to perform operations comprising:
  receiving a search query from a user,
  receiving search results responsive to the search query;
  providing search results for display to the user;
  receiving one or more user interactions associated with the search results;
  generating a search interaction score based on the one or more user interactions;
  determining that the search interaction score exceeds a threshold search interaction score;
  receiving a reminder event relating to the search query, wherein the reminder event is prompted by an occurrence other than re-submission of the search query by the user; and
  in response to determining that the search interaction score exceeds the threshold search interaction score and the reminder event, providing a notification to the user relating to the search query,
  wherein the notification invites the user to re-engage the search query and the search results,
  wherein the one or more user interactions associated with the search results are selected from a group including a selection of, an endorsement of, a sharing of, and a comment on an entry in the search results, and
  wherein the occurrence prompting the reminder event corresponds to one or more subsequent search queries, related to or matching the search query, reaching a threshold level of popularity.

18. The non-transitory computer readable storage medium of claim 17, wherein the interaction score is reflective of a time period in which the one or more user interactions associated with the search results occurred.

19. The non-transitory computer readable storage medium of claim 17, wherein generating a search interaction score comprises assigning a numerical value to each of the one or more user interactions associated with the search results.

20. The non-transitory computer readable storage medium of claim 17, wherein the operations further comprise:
  receiving a user response to the notification; and
  upon receiving the user response to the notification, displaying search results responsive to the search query.

21. The non-transitory computer readable storage medium of claim 17, wherein the reminder event relating to the search query is prompted by global search trends.

22. The non-transitory computer readable storage medium of claim 17, wherein the reminder event is prompted by a passage of a predetermined time in which the user has not re-submitted the search query.

23. The non-transitory computer readable storage medium of claim 17, wherein the threshold search interaction score is a mean interaction score based on the user's past search interaction scores.

24. The non-transitory computer readable storage medium of claim 17, wherein the threshold search interaction score is unique to the user.

* * * * *